(12) United States Patent
Falconi et al.

(10) Patent No.: US 12,271,160 B2
(45) Date of Patent: Apr. 8, 2025

(54) RST SMITH PREDICTOR

(71) Applicants: Schneider Electric Industries SAS, Rueil-Malmaison (FR); CONSERVATOIRE NATIONAL DES ARTS ET MÉTIERS, Paris (FR)

(72) Inventors: Franco Falconi, Paris (FR); Stefan Capitaneanu, Limours (FR); Hervé Guillard, Paris (FR); Tarek Raïssi, Paris (FR)

(73) Assignees: Schneider Electric Industries SAS, Rueil-Malmaison (FR); Conservatoire National Des Arts et Métiers, Paris (FR)

( * ) Notice: Subject to any disclaimer, the term of this patent is extended or adjusted under 35 U.S.C. 154(b) by 307 days.

(21) Appl. No.: 17/580,857

(22) Filed: Jan. 21, 2022

(65) Prior Publication Data
US 2022/0317637 A1  Oct. 6, 2022

Related U.S. Application Data

(60) Provisional application No. 63/189,285, filed on May 17, 2021, provisional application No. 63/165,581, filed on Mar. 24, 2021.

(51) Int. Cl.
*G05B 13/04* (2006.01)
(52) U.S. Cl.
CPC ......... *G05B 13/048* (2013.01); *G05B 13/042* (2013.01)
(58) Field of Classification Search
CPC ............................ G05B 13/048; G05B 13/042
See application file for complete search history.

(56) References Cited

U.S. PATENT DOCUMENTS

| | | | |
|---|---|---|---|
| 2009/0043546 A1* | 2/2009 | Srinivasan | G05B 13/04 703/2 |
| 2009/0112335 A1* | 4/2009 | Mehta | G05B 23/0243 700/29 |

OTHER PUBLICATIONS

A. Jacknoon, M. Hassan and S. E. Ferik, "Design of RST controllers based on intelligent optimization algorithms," 2016 Conference of Basic Sciences and Engineering Studies (SGCAC), Khartoum, Sudan, 2016, pp. 177-182 (Year: 2016).*
I.D. Landau, The R-S-T digital controller design and applications, Control Engineering Practice, vol. 6, Issue 2, 1998, pp. 155-165 (Year: 1998).*

(Continued)

*Primary Examiner* — Christopher E. Everett
(74) *Attorney, Agent, or Firm* — Troutman Pepper Locke LLP

(57) ABSTRACT

A predictive control method and system are provided for controlling a device or system. The control method and system involves receiving a setpoint signal as input; and performing closed loop control of the device or system by outputting a control signal according to the setpoint signal and a response model of the device or system using a predictive control algorithm. The predictive control algorithm is configured to implement control according to a polynomial representation for regulation, sensitivity and tracking and further implement non-linearity or time delay compensation using the response model. The closed loop control is tunable using an adjustable single parameter for accelerating or decelerating the closed loop control relative to an open loop control scenario.

16 Claims, 13 Drawing Sheets

(56) References Cited

OTHER PUBLICATIONS

O'Dwyer, Aidan : A reference guide to Smith predictor based methods for the compensation of dead-time processes. Proceedings of the IEE Irish Signals and Systems Conference, pp. 231-238, Dublin City University, Sep. 2005. doi: 10.21427/6sck-s48 (Year: 2005).*

Ioan D. Landau and Gianluca Zito, Digital Control Systems Identification, design and implementation, GIPSA—LAB, 2020 (Year: 2020).*

Extended European Search Report dated Aug. 19, 2022 for corresponding European Patent Application No. 22305192.1-1205, 8 pages.

Franco Falconi et al., "A novel robust control strategy for industrial systems with time delay," 2021 5th International Conference on Control and Fault-Tolerant Ssystems (SYSTOL), IEEE, Sep. 29, 2021, pp. 372-377.

I.D. Landau, "Robust Digital Control of Systems with Time Delay," Decision and Control, 1994, Proceedings of the 33rd IEEE Conference on Lake Buena Vista, FL, USA, Dec. 14-16, 1994, vol. 1, Dec. 14, 1994, pp. 865-869.

Xavier Litrico et al., "Modelling and Robust Control of a Dam-River System," Systems, Man, and Cybernetics, 1998, 1998 IEEE International Conference E on San Diego, CA, Oct. 11-14, 1998, vol. 4, Oct. 11, 1998, pp. 3862-3867.

European Examination Report dated Oct. 23, 2023 corresponding with European Patent Application No. 22305192.1, 6 pages.

* cited by examiner

RST SMITH PREDICTOR

The present application claims priority to U.S. Provisional Patent Appln Ser. No. 63/165,581 filed on Mar. 24, 2021 entitled RST SMITH PREDICTOR, and U.S. Provisional Patent Appln Ser. No. 63/189,285 filed on May 17, 2021, entitled RST SMITH PREDICTOR, the entire contents of each of the aforementioned applications are herein expressly incorporated by reference.

FIELD

The present disclosure is generally directed to control architecture, and more particularly, to a predictive control method and system for use in controlling industrial or other processes or systems or components thereof.

BACKGROUND

Process control can refer to a methodology for controlling the operational parameters of a process by monitoring one or more of its characteristics over time. It is used to ensure that the quality and the efficiency of a process do not vary substantially during a single run or over the course of several runs. Process control can be employed in the manufacturing sector as well as service and other industries.

SUMMARY

In accordance with an embodiment, a predictive control method and system are provided for controlling a device or system. The control method and system involve receiving a setpoint signal as input; and performing closed loop control of the device or system by outputting a control signal according to the setpoint signal and a response model of the device or system using a predictive control algorithm. The predictive control algorithm is configured to implement control according to a polynomial representation for regulation, sensitivity and tracking and further implement non-linearity or time delay compensation using the response model. The closed loop control is tunable using an adjustable single parameter for accelerating or decelerating the closed loop control relative to an open loop control scenario. The control method and system can be implemented, for example, through a controller(s) for an industrial process or system.

In various embodiments, the polynomial representation can include at least transfer functions R, S and T for regulation, sensitivity and tracking, respectively, and the coefficients for the transfer functions R, S and T are a function of the adjustable single parameter.

In accordance with an embodiment, the response model includes a linear part and a non-linear part (e.g., pure delay or feedback delay). The predictive control algorithm employs the response model to remove non-linearity (e.g., separate the linear part from the non-linear part), thereby compensating for time delay and enabling linear control through an RST control strategy (e.g., the linear part is controlled by the RST control strategy). The time delay can be a dead time.

In accordance with a further embodiment, the closed loop control can include a feedback loop to an output of a command law to make an estimation of an input disturbance.

In accordance with another embodiment, the device or system comprises equipment to be controlled in an industrial process or system.

In yet a further embodiment, the control method and system can further involve sensing operating characteristic(s) of the device or system using one or more sensors. The sensed operating characteristic(s) can be feedback for closed loop control. Furthermore, the control method and system also can involve analyzing operation(s) of the device or system to determine if the closed loop control needs to be tuned; and adaptively tuning the closed loop control using the adjustable single parameter (e.g., changing a value of the parameter) if the closed loop control needs to be tuned. The closed loop control can be adaptively tuned according to analysis of the operations of the device or system or sensed, measured or derived operating characteristic(s) of the device or system.

It is to be understood that both the foregoing general description and the following detailed description are exemplary and explanatory only and are not restrictive of the invention, as disclosed or claimed. The claims should be entitled to their full breadth of scope, including equivalents.

DESCRIPTION OF THE FIGURES

The description of the various example embodiments is explained in conjunction with the appended drawings.

DISCUSSION OF EXAMPLE EMBODIMENTS

A predictive control method and system are provided, which can be used for controlling a device or system (sometimes referred to herein generally as a "plant") of an industrial or other process. The control method and system can implement closed loop control of the device or system using a predictive control algorithm (or process). The predictive control algorithm is configured to implement control according to a polynomial representation for regulation, sensitivity and tracking and further implement non-linearity or time delay compensation using the response model (e.g., plant model). The closed loop control is tunable using an adjustable single parameter for accelerating or decelerating the closed loop control relative to an open loop control scenario. For example, the control method and system can incorporate RST control blocs, such as from an RST predictor, to a Smith predictor and can select suitable transfer functions R(s), S(s) and T(s) for each case (e.g., stable or integrating dead-time) to provide an improved predictor or controller, examples of which are referred herein as an RST Smith predictor or controller Such a control method and system can provide various benefits and advantages. First, the same control architecture can be used for stable/unstable/integrating plants without dead time and stable/integrating plants with dead time. Second, the tuning of the control system (e.g., controller(s)) can be performed with a single (or one) parameter, which can be adjusted. The control method and system can be implemented for "n" order processes (e.g., not limited to first order processes). The control method and system can extend the Smith predictor to integrating systems with time delay instead of using the modified Smith predictor or the finite spectrum assignment (which are techniques that can complicate the tuning of a controller).

Accordingly, the control method and system can enable automation experts to tackle different types of control problems, with the same control architecture. Such a simple tuning controller that can work for industrial processes can save a significant amount of time for engineers employing this solution. Furthermore, the training of engineers also can be simplified because the control architecture is the same. The control method and system also can provide a flexible and simplified implementation in a Programmable Logic Controller (PLC) or in a software solution (e.g., Schneider Electric's Ecostruxure Automation Expert) through the same control architecture.

Figure 1:
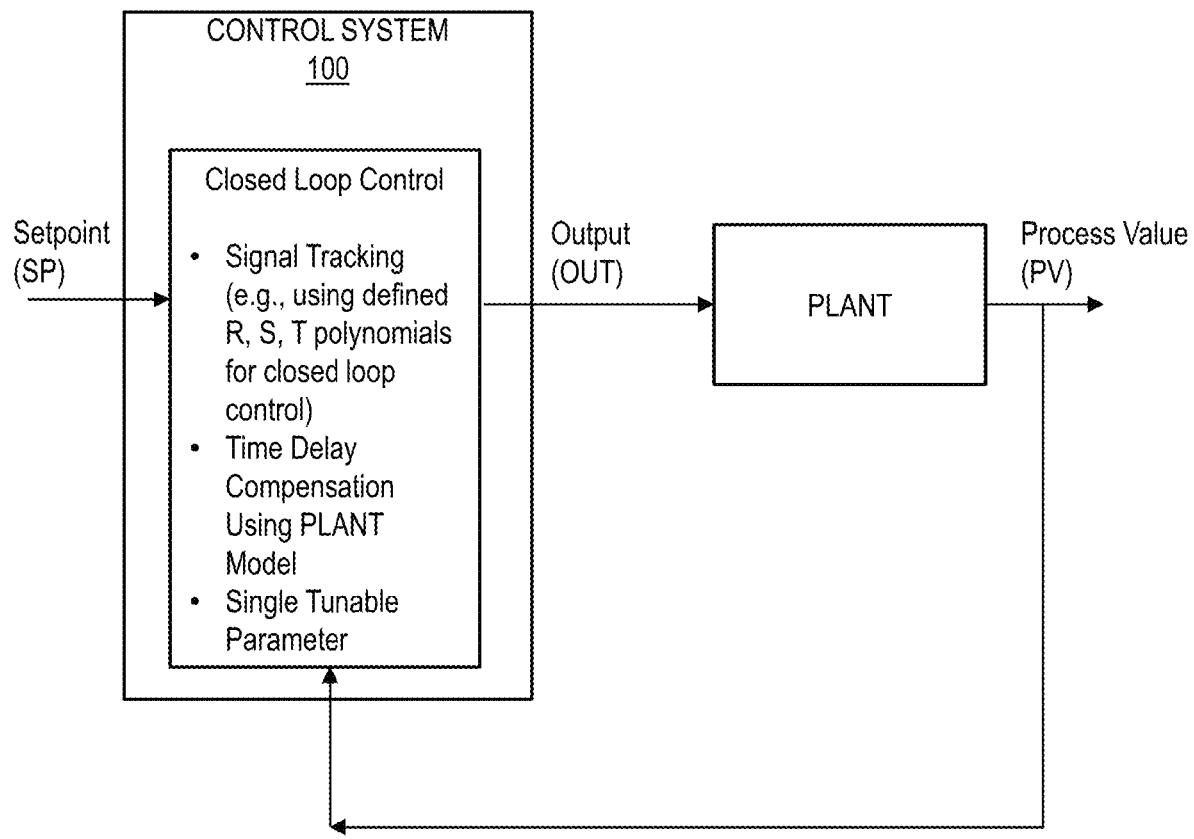
FIG. 1 is a high-level block diagram of an example control system using a predictive control algorithm, in accordance with an embodiment of the present disclosure.

The control method and system, described herein, can be implemented in a controller(s) for use in industrial control applications, such as to regulate temperature, flow, pressure, speed and other process variable(s) or value(s) (also referred to as PV) by controlling the operation of a device(s) or system(s), or for use in other applications to control the operation of other device(s) and system(s), including those of a mechanical nature. The industrial applications can include, but is not limited to environmental control operations and equipment (e.g., HVAC(s) or other environment control equipment in a building or facility), manufacturing operations and equipment (e.g., chemical processing plant or other manufacturing plant), or other operations and equipment. The controller can be a discrete hardware component, or a function within a large computerized control system, such as, for example, a Distributed Control Systems (DCS), Supervisory Control And Data Acquisition (SCADA), Programmable Logic Controller (PLC) or other control system. A high-level block diagram of an example control system 100 is shown in FIG. 1, which can receive a setpoint signal as input, and perform closed loop control of a plant by outputting a control signal according to the setpoint signal and a response model of the device or system using a predictive control algorithm, such as described herein.

These and other example predictive control methods and systems (and features thereof) of the present disclosure are shown and described in the attached figures and Appendices. An introductory explanation is provided immediately below, and will be followed by a discussion of the various control strategies (including a newly proposed control strategy in accordance with various embodiments of the present disclosure) and a discussion of simulated results comparing different control methods.

I. Introduction

The main challenge that automation engineers face, in industrial process control, is finding a robust and simple tunable controller that satisfies the client requirements. Model-based control techniques have the advantage of a systematic tuning of controllers using mathematical models. This property represents a huge gain of time compared to the tuning of a controller without prior knowledge of the model. Complex processes are often modeled by high order transfer functions which lead to a more complex elaboration for controllers. In practice, time delays are often incorporated in models to take into account nonlinear behaviors observed in industrial processes (diffusion phenomena, friction . . . ). Overviews of the problems that are introduced by a delay are discussed in [1] L. Mirkin and Z. J. Palmor, *Control Issues in Systems with Loop Delays.* Boston, MA: Birkh'auser Boston, 2005, pp. 627-648, and [2] J.-P. Richard, "Time-delay systems: an overview of some recent advances and open problems," *Automatica,* vol. 39, no. 10, pp. 1667-1694, 2003. A comprehensive study of several control techniques for time delay systems is proposed in [3] K. Gu, "Control of dead-time processes (j. e. normey-rico and e. f. camacho; 2007) [book review]," *IEEE Control Systems Magazine,* vol. 28, no. 5, pp. 136-137, 2008. The present disclosure presents an easy-tunable robust controller based on the Smith predictor and a robust RST controller design.

When a dead-time is introduced into a system, its approximation can lead to a high order transfer function for each control block of the RST controller. A solution to this problem would be to use a Smith Predictor [4] ("Chapter 10—the smith predictor, the modified smith predictor, and the finite spectrum assignment: A comparative study," in *Stability, Control and Application of Time-delay Systems,* Q. Gao and H. R. Karimi, Eds. Butterworth-Heinemann, 2019, pp. 209-226). Indeed, in order to cope with time delay, Smith proposed in [5] (O. J. M. SMITH, "A controller to overcome dead time," *ISA J.,* vol. 6, pp. 28-33, 1959. [Online]. Available: https://ci.nii.ac.jp/naid/10003093722/en/) a structure based on a simple idea: Is it possible to eliminate the influence of dead-time in the synthesis of the controller? The answer to this question can be translated into an equation which leads to the Smith predictor structure. The main idea of Smith can therefore be applied to any type of controller. For a more detailed analysis of the smith predictor, reference is made to the paper [6] (K. Watanabe and M. Ito, "A process-model control for linear systems with delay," *IEEE Transactions on Automatic Control,* vol. 26, no. 6, pp.

Figure 2:
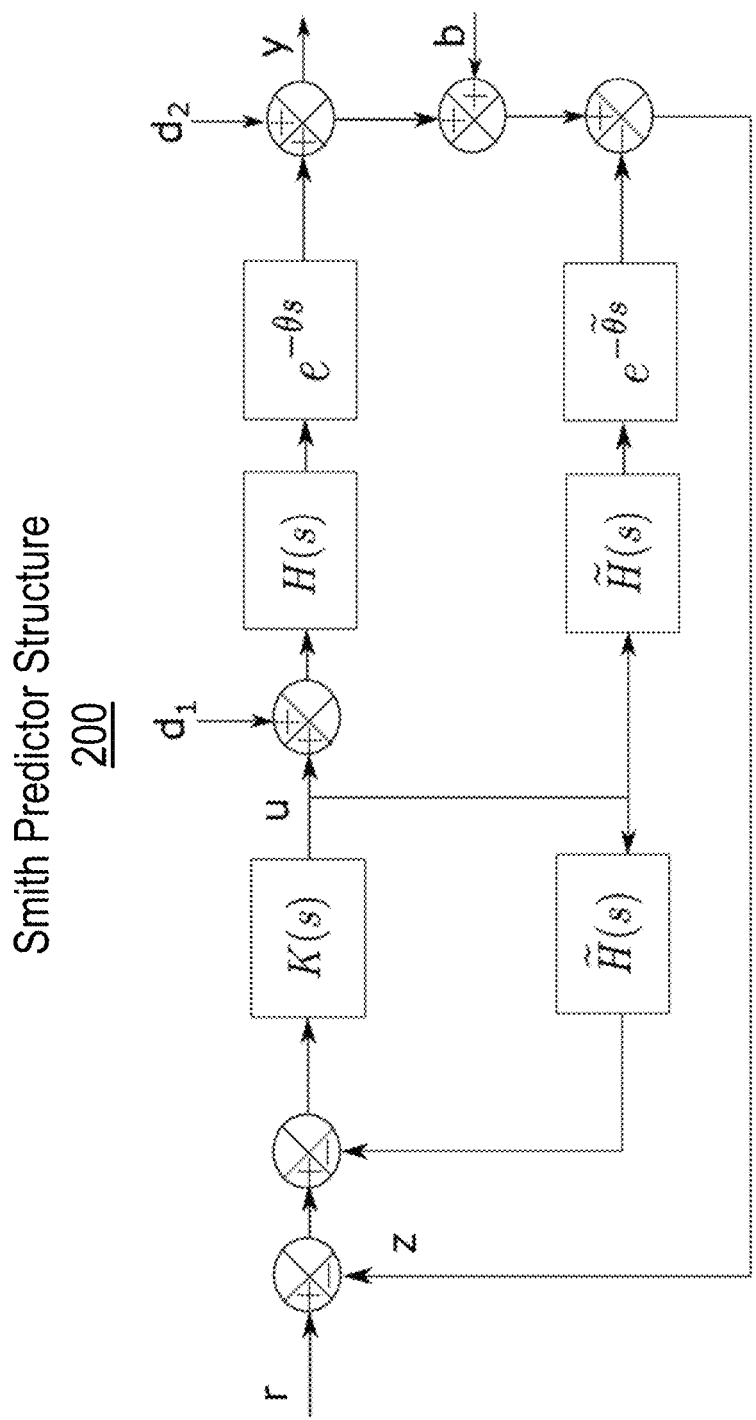
FIG. 2 is block diagram of a general structure of a Smith predictor.

1261-1269, 1981) in which the authors studied extensively this type of controller. The general structure of the Smith predictor is presented in the block diagram of FIG. 2, where r is the reference signal, z is the feed-back signal, u is the control signal, $d_1$ is the load disturbance, $d_2$ is the output disturbance, b is the noise measurement, H(s) is the delay-free system, $\tilde{H}(s)$ is the delay-free model, K(s) is the controller designed for the delay-free system, $\theta$ is the time delay of the system and $\tilde{\theta}$ is the estimated time-delay.

By assuming that the model fits perfectly the system, that is to say $\tilde{H}(s)=H(s)$ and $\tilde{\theta}(s)=\theta(s)$, the output is given by:

$$y(s) = T_r(s) \cdot r(s) + T_{d1}(s) \cdot d_1(s) + T_{d2}(s) \cdot d_2(s) + T_b(s) \cdot b(s)$$

Where:
$$\begin{cases} T_r(s) = \dfrac{K(s)H(s)}{1+K(s)H(s)} e^{-\theta s} \\ T_{d_1}(s) = \dfrac{\left[1+K(s)H(s)-K(s)H(s)e^{-\theta s}\right]}{1+K(s)H(s)} H(s) e^{-\theta s} \\ T_{d_2}(s) = \dfrac{1+K(s)H(s)-K(s)H(s)e^{-\theta s}}{1+K(s)H(s)} \\ T_b(s) = -\dfrac{K(s)H(s)}{1+K(s)H\{s\}} e^{-\theta s} \end{cases}$$

It is important to point out that if the system is an integrator or unstable, the transfer function of the load disturbance is unstable. Indeed, $T_{d1}(s)$ has the roots of H(s). To cope with this problem a modified Smith predictor structure is used. This modified structure extends not only the smith predictor to integrating plants as it is described in [7] (M. R. Matausek and A. D. Micic, "A modified smith predictor for controlling a process with an integrator and long dead-time," *IEEE Transactions on Automatic Control*, vol. 41, no. 8, pp. 1199-1203, 1996) and [8] (W. D. Zhang and Y. X. Sun, "Modified smith predictor for controlling integrator/time delay processes," *Industrial & Engineering Chemistry Research*, vol. 35, no. 8, pp. 2769-2772, 1996. [Online]. Available: https://doi.org/10.1021/ie950664v) but also to unstable plants as it is shown in [9] (A. S. Rao, V. S. R. Rao, and M. Chidambaram, "Simple analytical design of modified smith predictor with improved performance for unstable first-order plus time delay (foptd) processes," *Industrial & Engineering Chemistry Research*, vol. 46, no. 13, pp. 4561-4571, 2007. [Online]. Available: https://doi.org/10.1021/ie061308n). The present disclosure firstly presents below a proposed control structure and its design, in accordance with various embodiments. Then, the control strategy is compared to other tuning methods. The design of the controller is done in terms of robust stability by considering its margin modulus.

II. Control Strategy for Industrial Systems

Figure 3:
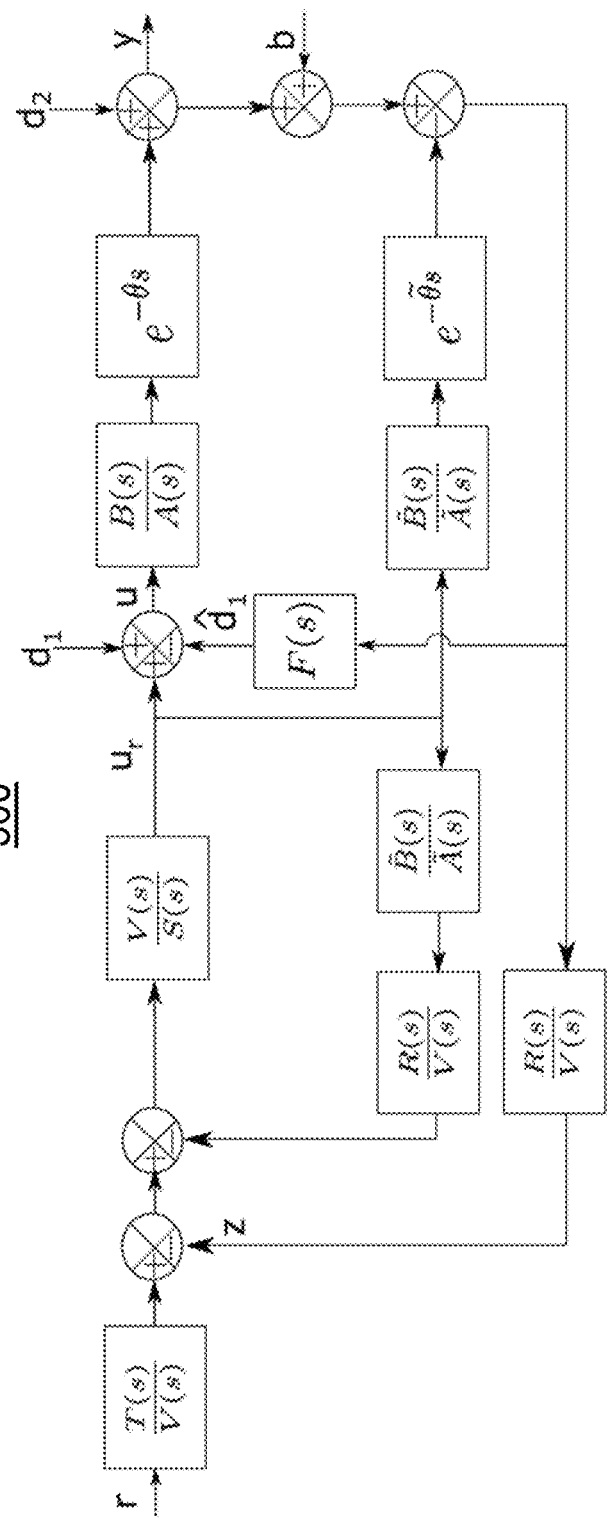
FIG. 3 is a block diagram of an RST Smith predictor or controller incorporating an additional feedback to the output of the command law to make an estimation of the input disturbance, which can be implemented in the control system of FIG. 1, in accordance with an embodiment of the present disclosure

A. Modified Smith Predictor with RST Controller:

An extensive study on the performance and robustness of monovariable and multivariable controllers is provided in [10] (B. Henri and G. Hervé, *Commande des systèmes performance et robustesse: régulateurs monovariables et multivariables*, ser. Technosup les filires technologiques des enseignements supriewrs. Paris: Ellipses, DL 2012, cop. 2012). The following robust RST design uses techniques described in [10]. In what follows, the controller design is done by assuming that the model fits perfectly the system. Let $$H(s) = \frac{B(s)}{A(s)}$$

such that d°(B)=m, d°(A)=n with (m, n)∈ ℕ². The transfer function is supposed to be strictly proper m<n and non-derivative B(0)≠0. Finally B(s) and A(s) are coprime. That is to say they do not share any common root. A feed-forward transfer function $$F(s) = \frac{F_n(s)}{F_d(s)}$$

is introduced in order to cope with the classical Smith predictor's limitation for integrating and unstable plants (the poles of A(s) and $T_{d1}(s)$ are no longer common if F(s)≠0. An example of the block diagram of the proposed controller is shown in FIG. 3, where:
  d'(R(s))=d'(A)
  d'(S(s))=d'(R)+$\delta_0$ with $\delta_0 \in$ ℕ²
  d'(V(s))≤d'(S)
  d'(T(s))≤d'(V)
  F(s) must be a proper transfer function For clarity purposes $T_{u \to v}(s)$ is used to represent the transfer function relating u(s) to v(s) such that $$T_{u \to v}(s) = \frac{v(s)}{u(s)}.$$

In this case, four transfer functions of the closed loop system are given by:

$$\begin{cases} T_{r \to y}(s) = \dfrac{B(s)T(s)}{A(s)S(s)+B(s)R(s)} e^{-\theta s} \\ T_{d_1 \to y}(s) = \dfrac{B(s)F_d(s) \cdot [A(s)S(s)+B(s)R(s) \cdot (1-e^{-\theta s})]}{[A(s)S(s)+B(s)R(s)] \cdot [A(s)F_d(s)+F_n(s)B(s)e^{-\theta s}]} e^{-\theta s} \\ T_{d_2 \to y}(s) = \dfrac{A(s)F_d(s) \cdot [A(s)S(s)+B(s)R(s) \cdot (1-e^{-\theta s})]}{[A(s)S(s)+B(s)R(s)] \cdot [A(s)F_d(s)+F_n(s)B(s)e^{-\theta s}]} \\ T_{b \to y}(s) = -\dfrac{B(s)[A(s)R(s)F_d(s)+F_n(s) \cdot (A(s)S(s)+B(s)R(s))]}{[A(s)S(s)+B(s)R(s)] \cdot [A(s)F_d(s)+F_n(s)B(s)e^{-\theta s}]} e^{-\theta s} \end{cases}$$

One can see that that A(s)S(s)+B(s)R(s) is a common denominator of each transfer function. Also, the factor $A(s)F_d(s)+F_n(s)B(s)^{-\theta s}$ is added by the feedback $d_1(s)$ which can be considered as a feed-forward compensator for the input disturbance $d_1(s)$. This means that the roots of A(s)S(s)+B(s)R(s) and $A(s)F_d(s)+F_n(s)B(s)e^{-\theta s}$ determine the performance of the closed loop system. Also, it can be noticed that the transfer function with respect to the reference signal depends only on A(s)S(s)+B(s)R(s). The Stability of the latter polynomial is guaranteed by the RST root locus method. If $\theta$=0 and the disturbance feedback is also set to zero $F_n(s)$=0, then one can verify that the transfer functions simplify into the classical RST closed loop equations. The controller architecture is therefore unchanged for systems without dead-time.

B. Design Principle for the Proposed Method:

Polynomials R(s), S(s), T(s) are chosen in order to ensure the following properties for the closed loop:
  static error equal to zero;
  desired dynamics for disturbance rejection;
  desired dynamics of set point change (the dynamics for set point change and disturbance rejection are different as long as T(s)≠R(s));
  desired filtering quality of the measurement noise.

These requirements can be translated by the study of certain transfer functions.

1) The static error depends on:

$$T_{r \to e}(s) = \frac{B(s)[T(s)e^{-\theta s} - R(s)] - A(s)S(s)}{A(s)S(s) + B(s)R(s)}$$

2) The disturbance rejection depends on:

$$T_{d_1 \to e}(s) = \frac{B(s)F_d(s) \cdot [A(s)S(s) + B(s)R(s) \cdot (1 - e^{-\theta s})]}{[A(s)S(s) + B(s)R(s)] \cdot [A(s)F_d(s) + F_n(s)B(s)e^{-\theta s}]} e^{-\theta s}$$

$$T_{d_2 \to e}(s) = \frac{A(s)F_d(s) \cdot [A(s)S(s) + B(s)R(s) \cdot (1 - e^{-\theta s})]}{[A(s)S(s) + B(s)R(s)] \cdot [A(s)F_d(s) + F_n(s)B(s)e^{-\theta s}]}$$

3) The root locus of $A(s)S(s)+B(s)R(s)$ and the roots of $A(s)F_d(s)+F_n(s)B(s)e^{-\theta s}$ define the dynamics of set-point and disturbance rejection.

4) The desired filtering quality of the measurement noise depends on:

$$T_{b \to y}(s) = -\frac{B(s)[A(s)R(s)F_d(s) + F_n(s) \cdot (A(s)S(s) + B(s)R(s))]}{[A(s)S(s) + B(s)R(s)] \cdot [A(s)F_d(s) + F_n(s)B(s)e^{-\theta s}]} e^{-\theta s}$$

$$T_{b \to u}(s) = -\frac{A(s) \cdot [A(s)R(s)F_d(s) + F_n(s) \cdot (A(s)S(s) + B(s)R(s))]}{[A(s)S(s) + B(s)R(s)] \cdot [A(s)F_d(s) + F_n(s)B(s)e^{-\theta s}]}$$

In what follows $r(s)$, $d_1(s)$ and $d_2(s)$ are supposed to be step functions.

C. Controller Design:

Let us assume that the closed control loop is stable. In this case by applying the final value theorem it yields:

1) Disturbance rejection:

$$\lim_{t \to +\infty} e(t) = \lim_{t \to +\infty} (T_{d_1 \to e}(s) + T_{d_2 \to e}(s)) = 0$$

This condition is true if $$S(0)=0$$

which means that the controller has an integrating effect.

2) No static error:

$$\lim_{t \to +\infty} e(t) = \lim_{s \to 0} T_{r \to e}(s) = 0$$

which leads to $$T(0)=R(0)$$

3) Let $\delta$ be the relative degree of a rational polynomial such that $$\delta\left(\frac{B}{A}\right) = d°(A) - d°(B).$$

The relative degree of the transfer function with respect to noise measurement is then:

$$\delta(T_{b \to y}(s)) = \delta\left(\frac{B(s) \cdot (R(s)F_d(s) + S(s)F_n(s))}{A(s)S(s)F_d(s)}\right)$$

By choosing $F(s)$ such that $\delta(F(s)) > \delta_0$ it yields $d°(R(s)F_d(s)+S(s)F_n(s)) = d°(R(s)F(s))$ which means that:

$$\delta(T_{b \to y}(s)) = \delta\left(\frac{B(s)}{A(s)}\right) + \delta_0$$

The system $H(s)$ being strictly proper, one obtains:

$$\delta(T_{b \to y}(s)) \geq 1 + \delta_0$$

This demonstrates that the quality of the filtering is defined by the relative degree $\delta(H(s))$ of the system and increases as $\delta_0$ increases.

In order to ensure that that the noise b does not generate an important variation of the control signal u it is relevant to study its transfer function with respect to noise:

$$\delta(T_{b \to u}(s)) = \delta\left(\frac{R(s)F_d(s) + S(s)F_n(s)}{S(s)F_d(s)}\right)$$

Since $\delta(F(s)) > \delta_0$, it yields:

$$\delta(T_{b \to u}(s)) = \delta_0$$

Therefore, the relative degree $\delta_0$ determines entirely the behavior of the system against measurement noise.

As explained before, if $\theta=0$ the control structure is simplified to the classical RST controller. In order to do this, one has to choose $F_n(s)=F_n(s,\theta)$ such that $F_n(s,0)=0$.

D. R, S, and T Design:

The polynomials R and S are computed by solving the Bézout polynomial equation:

$$A(s)S(s)+B(s)R(s)=A_{cl}(s)$$

where $A_{cl}(s)$ is the denominator of the desired closed loop transfer function based on the root locus. By rearranging the terms $S(s)=s \cdot S_f(s)$ and $A_f(s)=s \cdot A(s)$ it yields:

$$A_f(s)S_f(s)+B(s)R(s)=A_{cl}(s)$$

Given that $A(s)$ and $B(s)$ are coprime and that $B(0) \neq 0$ the polynomials $A_f(s)$ and $B(s)$ are also coprime. This implies the existence of a unique solution $(R(s), S_f(s))$ that satisfies the Bézout polynomial equation. The closed loop polynomial can be decomposed into two separate polynomials $A_{cl}(s)=A_{cl1}(s) \cdot A_{cl2}(s)$ where the roots of $A_{cl1}(s)$ are chosen based on the poles of the system to be controlled and those of $A_{cl2}(s)$ are chosen with respect of the zeros of the system. It yields from this that $d°(A_{cl1}(s))=n+1$ and $d°(A_{cl2}(s))=n+\delta_0-1$.

Let $\alpha \in \mathbb{R}^+$ be the only tuning parameter of the controller. The root locus can be done by using the following rules:

1) Choice of the first n+1 roots $$s_{new} = -\frac{\alpha}{T_m}$$

where $T_m$ is the biggest time constant of the system.

2) The $n+\delta_0-1$ next roots are chosen with respect to the zeros of the system. If a zero is stable then the pole is equal to the zero. If it is unstable then, one can take the symmetric with respect to the imaginary axis as a new root. If the pole is too close to the imaginary axis one can move it towards the minimal speed set by $$-\frac{\alpha}{T_m}.$$

3) In order to have a closed loop polynomial of degree $2n+\delta_0$ if $m<n+\delta_0-1$ one still needs to choose $n+\delta_0-1-m$ roots. These roots can be assigned according to the minimal speed and the desired bandwidth of the system as follows $s_{fast}=\beta \cdot s_{new}$ where $\beta \in \mathbb{R}^+$.

In order to have the same dynamics for the closed loop as the open loop, for a change in the reference signal, T(s) has to cancel both the roots of $A_{cl2}(s)$ and the root related to the integration action introduced by polynomial S(s). This criterion leads to the following expression for T(s):

$$T(s) = \mu \cdot (s - s_{new}) \cdot A_{cl2}(s)$$

In order to ensure T(O)=R(O), one has to choose μ as follows:

$$\mu = -\frac{R(0)}{A_{cl2}(0) \cdot s_{new}}$$

Figure 4:
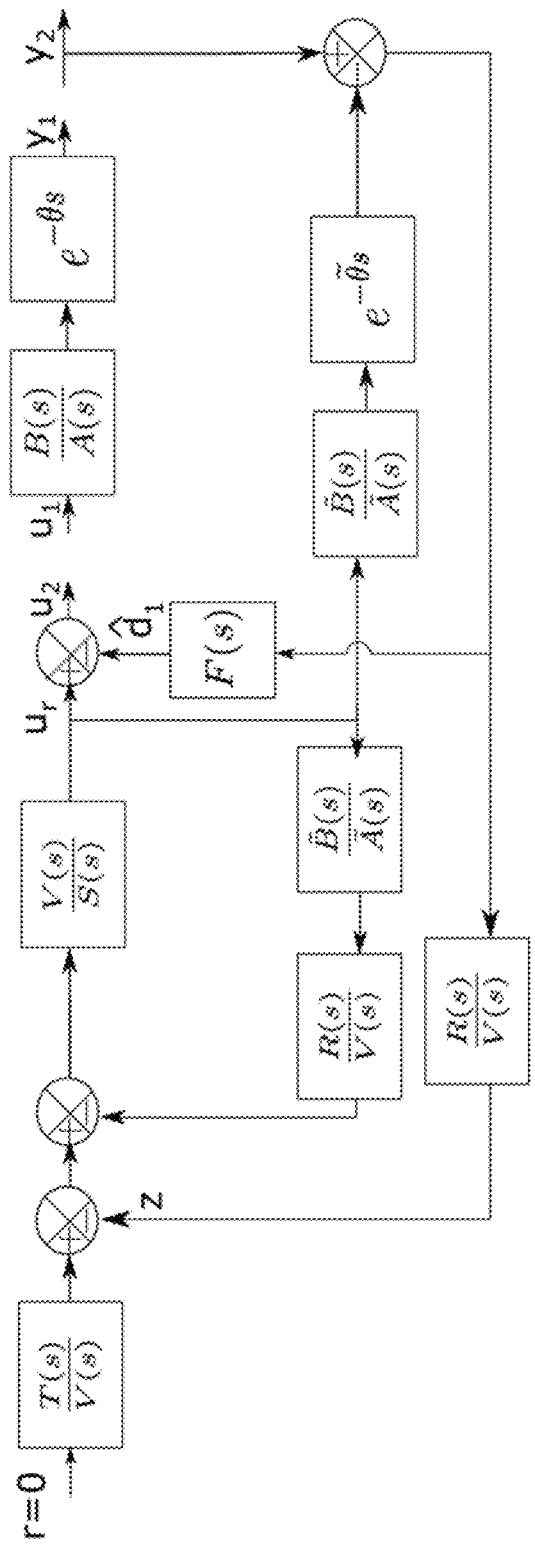
FIG. 4 is an open loop block diagram related to the control architecture of FIG. 3.

E. V, $F_n$ and $F_d$ Design:

The robust stability of the controller depends on the choice of polynomials $F_d(s)$ and $F_n(s)$. To study the robustness of the proposed controller one can consider the open loop block diagram in FIG. 4.

Consider:

$$L_i(s) = -\frac{u_2(s)}{u_1(s)}$$

$$L_0(s) = -\frac{y_1(s)}{y_2(s)}$$

and let $$L_{RST}(s) = \frac{B(s)R(s)}{A(s)S(s)}$$

be the open loop transfer function of the classical RST controller. It is easy to verify that $L_i(s)=L_0(s)=L(s)$. The resulting transfer function is:

$$L(s) = \frac{F_n(s,\theta)B(s)}{F_d(s)A(s)}e^{-\theta s} + \frac{L_{RST}(s)}{1+L_{RST}(s)\left(1-e^{-\theta s}\right)}e^{-\theta s}$$

The margin modulus is defined as $$M_m = \inf_{\omega \in \mathbb{R}^*_+} |1 + L(j\omega)|$$

One can choose the filter F(s) to have the same bandwidth as the RST controller. Let $F_n(s,\theta)=K_{F_n}(\theta)$ be a pure gain and $F_d(s)$ a filter of unit static gain. From this choice it yields that the static gain of the noise estimator F(s) is equal to $K_{F_n}(0)$.

The previous choice of polynomial T(s) leads to $d°(V(s))=d°(T(s))=d°(S(s))=n+\theta_0$. In order to respect previous criteria one can choose:

$$V(s) = F_d(s) = \left(1 - \frac{s}{s_{fast}}\right)^{n+\delta_0}$$

The static gain $K_F(\theta)$ has to be chosen in order to stabilize the denominator containing the time delay. Stabilization techniques for quasi-polynomials (polynomials with delays) are proposed in [11] (V. L. Kharitonov, "Robust stability analysis of time delay systems: A survey," *Annual Reviews in Control*, vol. 23, pp. 185-196, 1999. [Online]. Available: https://www.sciencedirect.com/science/article/pii/S1367578899900871) and [12] (K. Gu, V. L. Kharitonov, and J. Chen, *Stability of Time-Delay Systems*, ser. Control Engineering. Birkhäuser, 2003. [Online]. Available: https://doi.org/10.1007/978-1-4612-0039-0). Deriving general expressions for stability of delayed systems is complicated. In what follows tuning values are proposed for different types of systems. By considering that the fast poles converge quickly one can derive the following expressions for $K_{F_n}(\theta)$.

1) FOPDT and SOPDT systems: as explained previously a dead-time is introduced to simplify high order models. Over-damped high order systems can be approximated by a FOPDT (First order plus dead-time). Similarly under-damped high order systems can be modeled by SOPDT (Second order plus dead-time). A focus on the stability of second order quasi-polynomials with a simple time delay is proposed in [13] (E. Malakhovski and L. Mirkin, "On stability of second-order quasi-polynomials with a single delay," *Automatica*, vol. 42, no. 6, pp. 1041-1047, 2006. [Online]. Available: https://www.sciencedirect.com/science/article/pii/S0005109806000926). The following condition can be derived, for example, from the previously cited paper such that the stability of the quasi-polynomial $A(s)F_d(s)+F_n(s)B(s)e^{-\theta s}$ is ensured:

$$F_n(s,\theta) = K_{F_n}(\theta) = \frac{\tau}{1+\tau} \cdot \frac{1}{2}\left|\frac{A(0)}{B(0)}\right| < \left|\frac{A(0)}{B(0)}\right|$$

where $$\tau = \frac{\theta}{T_m}$$

2) Integrating case: the following expression is derived from the stability criterion proposed in [7]. The original criteria $$K_0 < \frac{1}{2\theta\tau}$$

can be modified as follows:

$$F_n(s,\theta) = K_{F_n}(\theta) = \left(1 - e^{-\tau^2}\right) \cdot \frac{1}{3B(0)\tau}$$

Where $$\tau = \frac{\theta}{T_m}$$

One can verify that $\forall \tau$, $(1-e^{-\tau^2}) \le 1$ which means that $$\frac{1 - e^{-\tau^2}}{3B(0)\tau} \le \frac{1}{2\theta\tau}$$

Also $\lim_{\theta \to 0} K_{F_n}(\theta) = 0$. The value 3 corresponds to a phase margin of 70°.

Therefore, the filter F(s) has a static gain $K_{Fn}(\theta)$ and a bandwidth based on the fast poles of the system. Once the controller is designed, the parameter $\alpha$ is adjusted in order to obtain the expected $M_m$ to ensure the robustness of the controller. One can choose $\beta=5$ to react to disturbances that are at most five times faster than the new poles. In [14] (I. Landau, A. Karimi, A. Voda, and D. Rey, "Robust digital control of flexible transmissions using the combined pole placement/sensitivity function shaping method," *European Journal of Control*, vol. 1, no. 2, pp. 122-133, 1995. [Online]. Available: https://www.sciencedirect.com/science/article/pii/S0947358095700152), the authors consider that $M_m > 0.5$ is an acceptable robustness.

III. Simulations

In this section a comparison is drawn between 3 different controllers:
1) The PID controller tuned as an IMC;
2) The IMC controllers used by Schneider (one for non-integrating plant and one for integrating plants);
3) The proposed controller in accordance with various embodiments, described herein.

The first two controllers have been chosen since they are widely used in the industry. The proposed controller, implemented for example in a PLC, is therefore compared to these controllers in order to illustrate its robustness and performance.

To be used in industrial applications the robustness to disturbances, noise measurements and modeling errors should be tested. To do so, let us consider three different cases. First, consider a high order over-damped or critically damped system with time delay. The second case considers a high order under-damped plant and finally an integrating process is considered. The following simulations are done by considering a 10% error on the estimation of the time delay. A white noise with a static signal to noise ratio (SNR) of 15 dB is added. Finally two steps disturbances (input and output) of amplitude 0.1·SP, where SP=1 is the process set point, are applied to the system. The parameters $\delta_0=1$ and $\beta=5$ are chosen for all the simulations.

A. High Order Over-Damped System:

Let us consider the following high order damped transfer function:

$$H(s) = \frac{1-s}{(s+1)^5} \cdot e^{-5s}$$

Such a system can be modeled accurately by a FOPDT one. By using a FOPDT identification algorithm [15] (Q. Bi, W.-J. Cai, E.-L. Lee, Q.-G. Wang, C.-C. Hang, and Y. Zhang, "Robust identification of first-order plus dead-time model from step response," *Control Engineering Practice*, vol. 7, no. 1, pp. 71-77, 1999. [Online]. Available: https://www.sciencedirect.com/science/article/pii/S096706619800166X), one can found the following transfer function for this process:

$$H(s) = \frac{0.9974}{2.4859s + 1} \cdot e^{-8.6652s}$$

Figure 5:
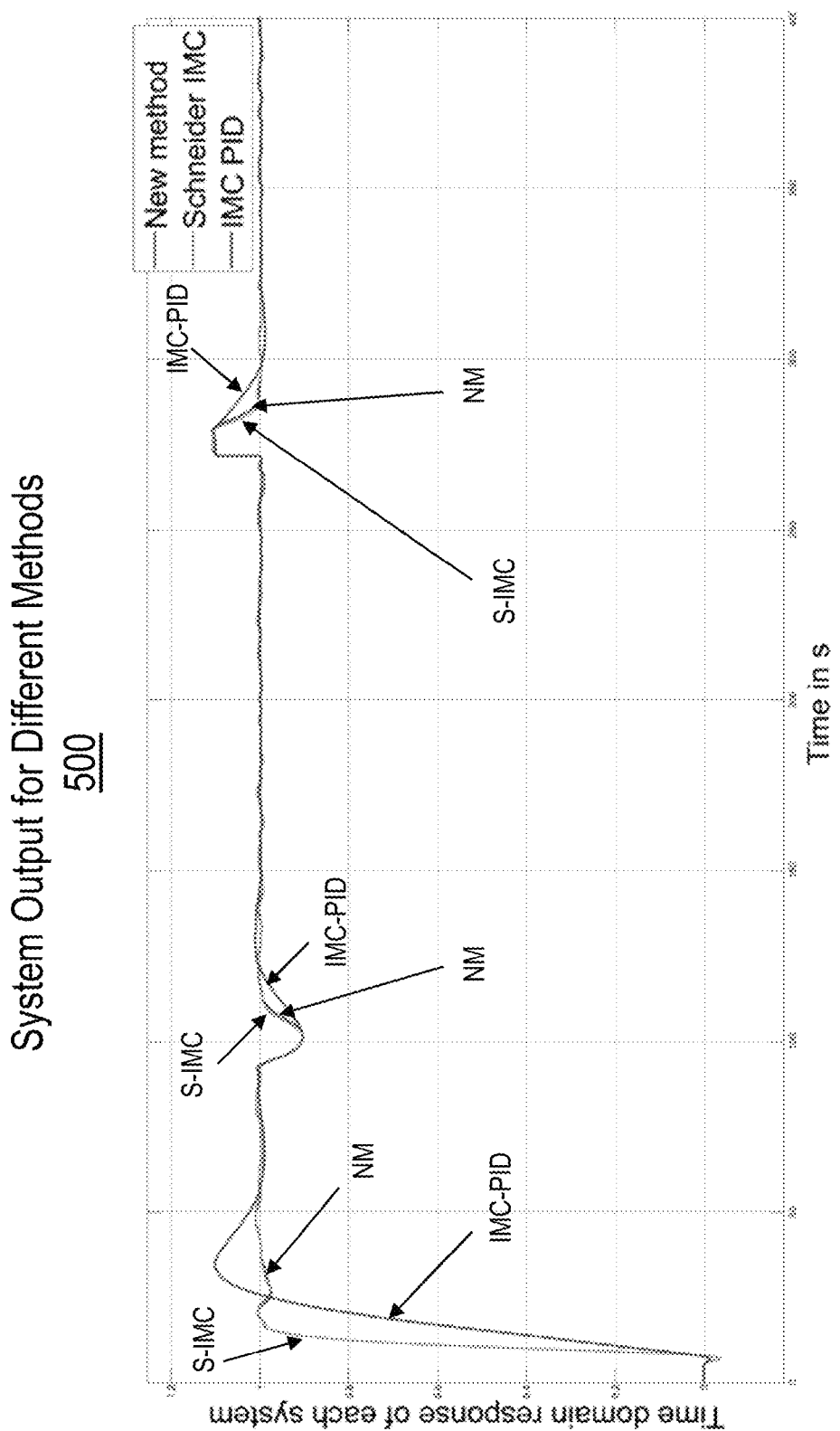
FIG. 5 is a graph showing simulation results of system output for the different control methods, in accordance with an embodiment.
Figure 6:
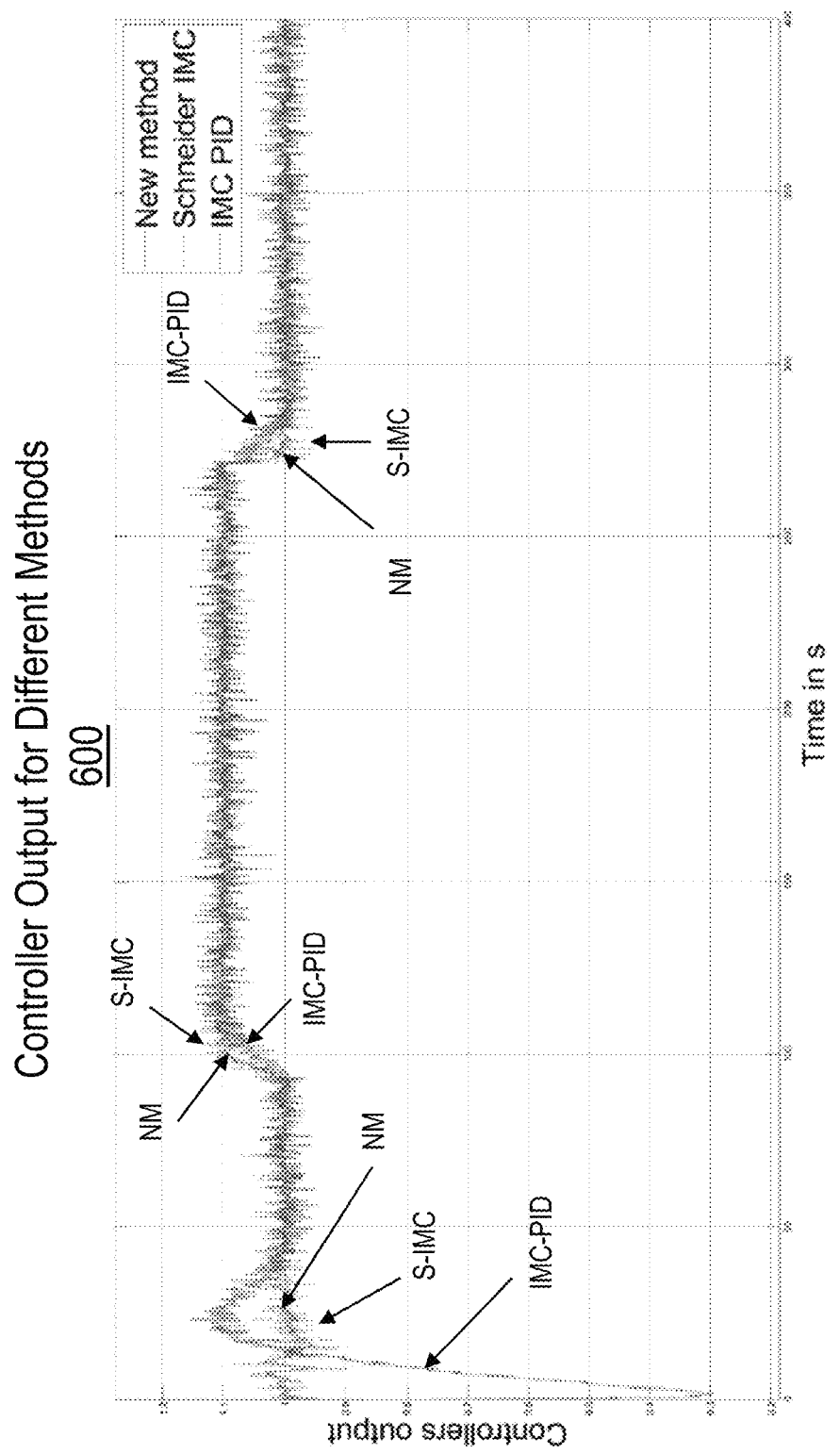
FIG. 6 is a graph showing simulation results of controller output for the different control methods, in accordance with an embodiment.

Let $\epsilon$ be the time-domain approximation error such that:

$$\varepsilon = \frac{1}{n+1} \sum_{k=m}^{m+n} [y(kT_s) - \hat{y}(kT_s)]^2$$

where $y$ and $\hat{y}$ are respectively the actual and estimated time domain response of the process, $T_s$ is the sample rate of the sensor, m is defined such that $mT_s > \theta$ and n is the number of points used during the identification. In this simulation, the error is $\varepsilon = 8.1761 \cdot 10^{-4}$. This small identification error shows the accuracy of such an approximation. FIG. 5 and FIG. 6 show the simulation results for all three methods in respective graphs 500 and 600.

The main advantage of the new method with respect to the two others, for this case, is the low noise on the controller output. Indeed, thanks to the relative degree $\delta_0$ the control signal is less affected by the noise measurement. This simulation has been performed with $M_m=0.56$ for $\alpha=1.5$.

B. High Order Under-Damped System:

Similarly to high order over-damped systems, high order under-damped systems can also be approximated by second order plus dead-time (SOPDT) systems. Let us consider the High order under-damped transfer function proposed in [16] (Granado, E. Mata, E. Revollar, S. Colmenares, and O. W. Pérez, "Study about system identification for second order process: an open and closed loop improvement," *Revista INGENIER'IA UC*, 2004. [Online]. Available: https://www.redalyc.org/articulo.oa?id=70711106):

$$H(s) = \frac{16s^4 + 53.76s^3 + 535.6s^2 + 860.2s + 4096}{s^6 + 5.04s^5 + 52.42s^4 + 162.3s^3 + 838.7s^2 + 1290s + 4096} e^{-0.9s}$$

A 10% error on the estimation of the time delay is added to the SOPDT identified in [16]:

$$H_2(s) = \frac{16.24}{s^2 + 0.6225s + 16.24} e^{-1s}$$

The corresponding time domain error is $\varepsilon = 8.2598 \cdot 10^{-4}$. In order to use the Schneider controller, the system should be modeled by a first order model. An overview of different system reduction algorithms can be found in [17] (D. J. Lucia, P. S. Beran, and W. A. Silva, "Reduced-order modeling: new approaches for computational physics," *Progress in Aerospace Sciences*, vol. 40, no. 1, pp. 51-117, 2004. [Online]. Available: https://www.sciencedirect.com/science/article/pii/S0376042103001131). The reduced first order model of the system is:

$$H_1(s) = \frac{-5.993s + 48.45}{s + 48.45} e^{-1s}$$

Let us use the reduced Model $H_1$ to tune the Schneider IMC and let us use $H_2$ for IMC PID and the proposed method. As explained in [18] (R. C. Panda, C.-C. Yu, and H.-P. Huang, "Pid tuning rules for sopdt systems: Review and some new results," *ISA Transactions*, vol. 43, no. 2, pp. 283-295, 2004. [Online]. Available: https://www.sciencedirect.com/science/article/pii/S0019057807600378), the IMC PID can be tuned from first or second order models.

The damping factor of a pole can be calculated as:

$$z = \left| \frac{Re(s_{pole})}{s_{pole}} \right|$$

Figure 7:
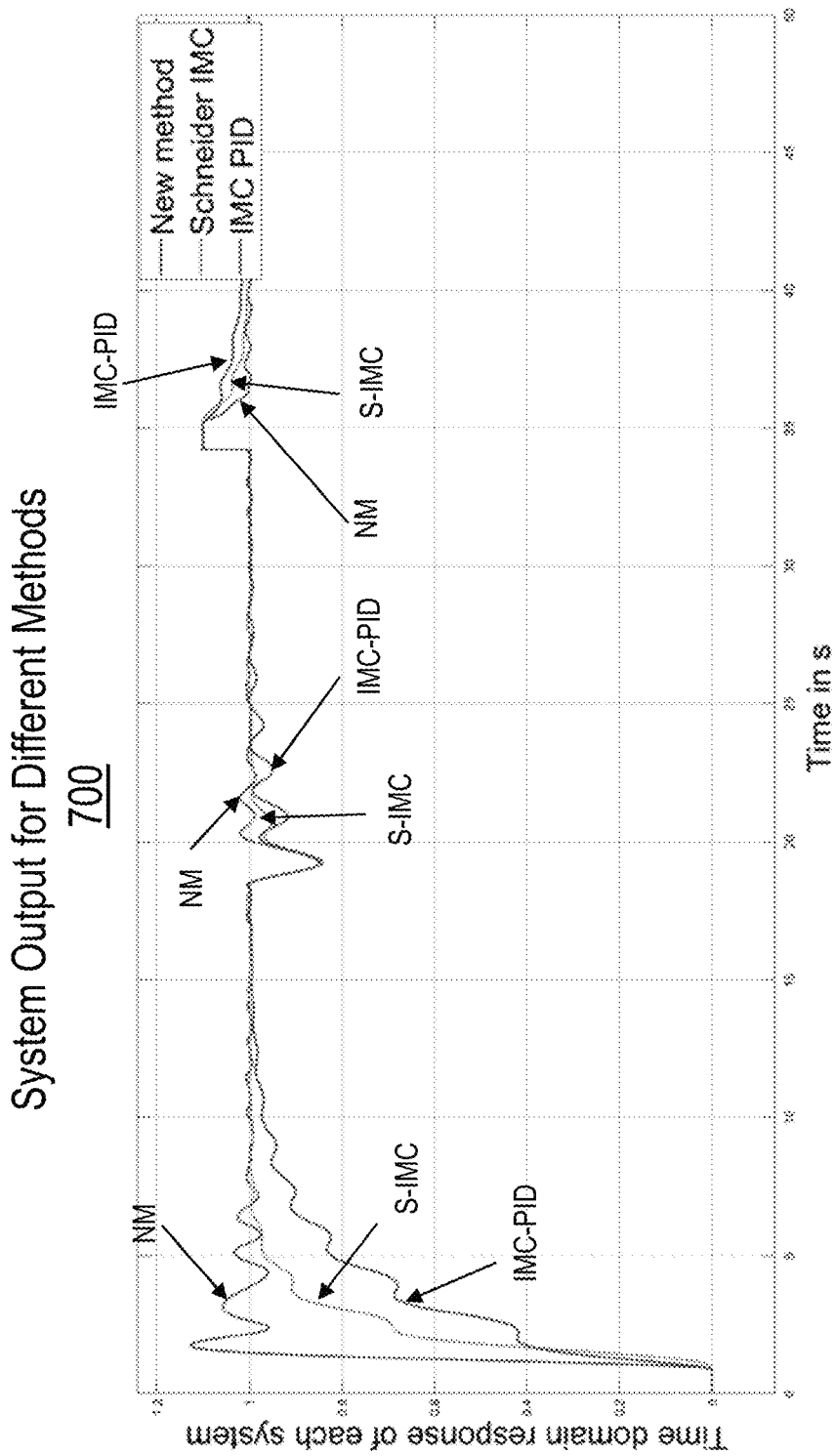
FIG. 7 is a graph showing simulation results of system output for the different control methods, in accordance with an embodiment.
Figure 8:
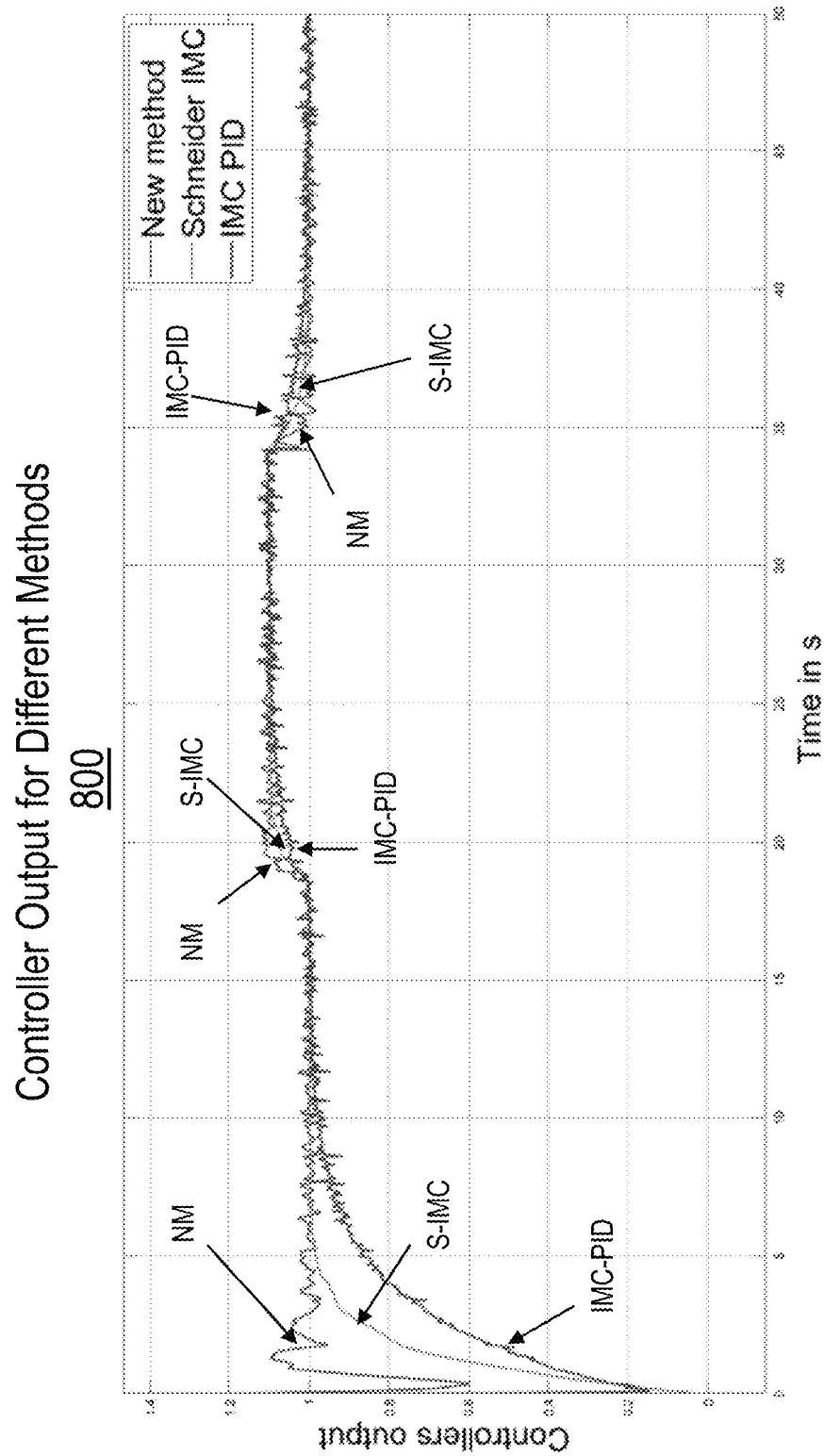
FIG. 8 is a graph showing simulation results of controller output for the different control methods, in accordance with an embodiment.

In this simulation $s_{pole} = -0.3113 \pm 4.0179i$ which leads to the damping factor $z_{natural} = 0.0772$. Such a low damped natural pole causes oscillations in the process output. The proposed method offers a better step response and disturbance rejection than the Schneider controller and the IMC PID, as illustrated in the graph 700 of FIG. 7. The maximum overshoot of the step response can be adjusted by increasing the value of α. The Schneider controller is less sensitive to noise measurement as it can be observed in the graph 800 of FIG. 8. This is due to the fact that the controller is almost a pure integrator (due to the modeling error, a small proportional gain can lead to an unstable behavior of the closed loop). Thus the controller noise magnitude is lower than in the new method. In addition, due to the model reduction, the physical meaning of the tuning parameter is lost in the current Schneider IMC method. On the contrary, the pole placement keeps a physical interpretation of the order of magnitudes by which the closed loop has been accelerated. This point can be considered as an important advantage in the case of oscillating industrial systems. The new damping factor with the pole placement is $z_{new} = 0.16$ which means that the controller has improved the system damping.

This simulation has been performed with $M_m = 0.65$ for α=0.55.

C. Integrating System:

A time-delay integrating system has the following transfer function:

$$H(s) = \frac{K_m}{s} e^{-\theta s}$$

For this simulations let us set a 10% error with respect to the time delay θ.

Figure 9:
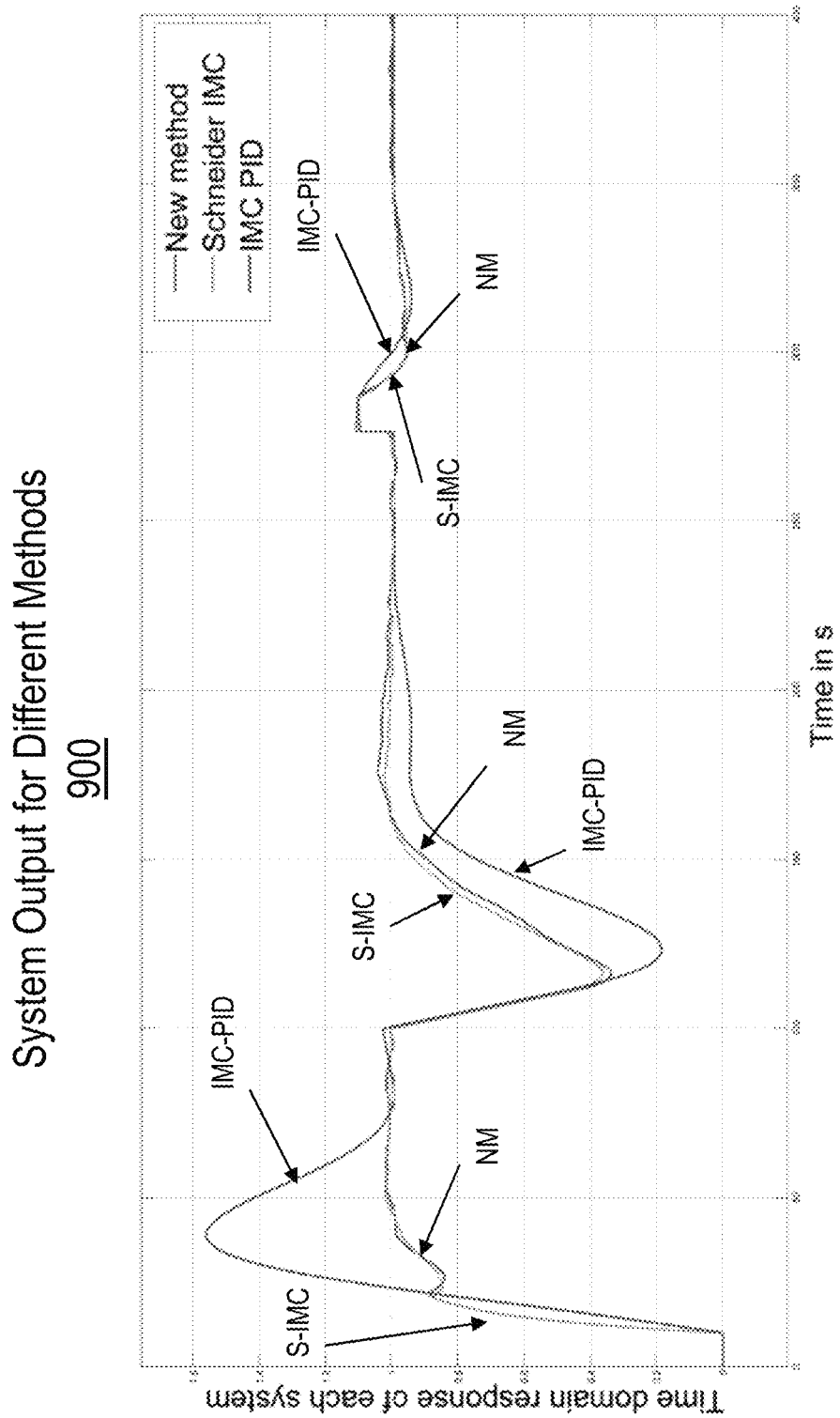
FIG. 9 is a graph showing simulation results of system output for the different control methods, in accordance with an embodiment.

The simulation results in the graph 900 of FIG. 9 shows that the systematic IMC PID tuning for integrating plants is not as efficient as the Schneider IMC and the proposed new method. Also one can remark that the performance of the proposed controller is quite similar to the Schneider one. This means that the proposed control architecture can also deal with integrating systems. This is an advantage because the tuning philosophy is the same as for the two previous cases. Whereas for the Schneider IMC the control strategy is completely different and two parameters need to be tuned.

Figure 10:
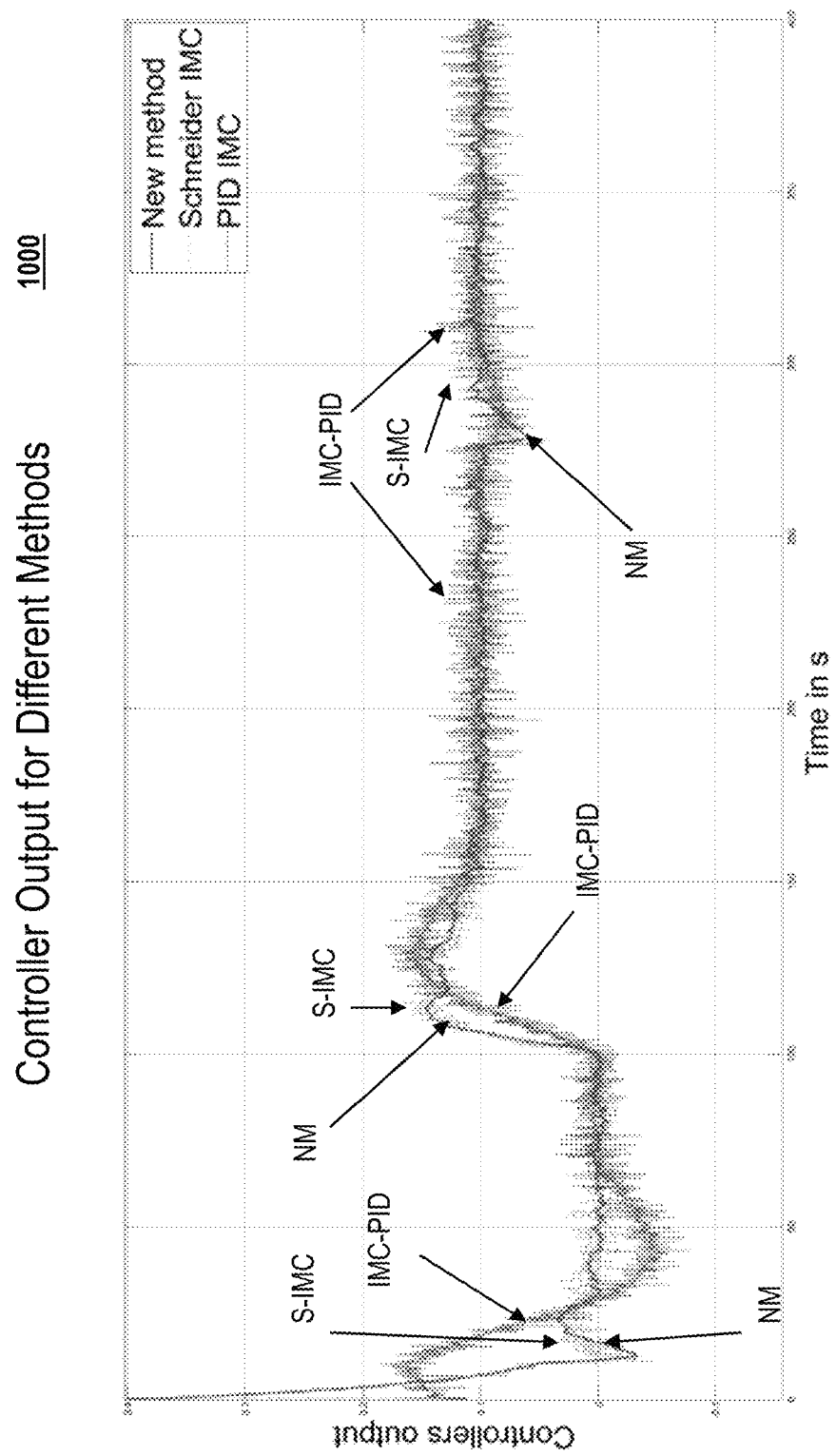
FIG. 10 is a graph showing simulation results of controller output for the different control methods, in accordance with an embodiment.

Finally, by analyzing the control signal in the simulation results in the graph 1000 of FIG. 10, it is important to notice that thanks to the integrated filtering in the RST Smith predictor, the actuator action has been smoothed.

The simulation has been performed with $M_m = 0.55$ for α=0.4.

IV. Conclusion

A modified Smith predictor tuning method based on the RST controller has been presented herein. The proposed architecture can deal with stable, unstable and integrating systems with or without time delay. The presented tuning method is easy to implement since it uses a unique parameter α. The tuning method has a physical interpretation because it is based on the acceleration of the biggest time constant of the process. The controller has been tested on high order over-damped and under-damped delayed systems as well as on integrating systems. Its performance has been compared to a PID tuned by an IMC method and to the current Schneider IMC controllers (one for stable plants and another for integrating plants). The proposed controller has the same speed performance than the two Schneider's IMC for over-damped and integrating processes but presents a better robustness and performance with oscillating systems. Thanks to the filtering function and the validation of the controller with the modulus margin $M_m$ the new method ensures a better robustness. The proposed method offers the advantage of using the same control structure for different types of systems, thus offering an easier practical implementation on an industrial Accordingly, the control system and method employs a new and adaptable control strategy that can enable, with one parameter (e.g., parameter α), the ability to control: Stable systems, Stable systems with time delay, Integrating systems, Integrating systems with time delay, Unstable systems, and Unstable systems with time delay.

Figure 11:
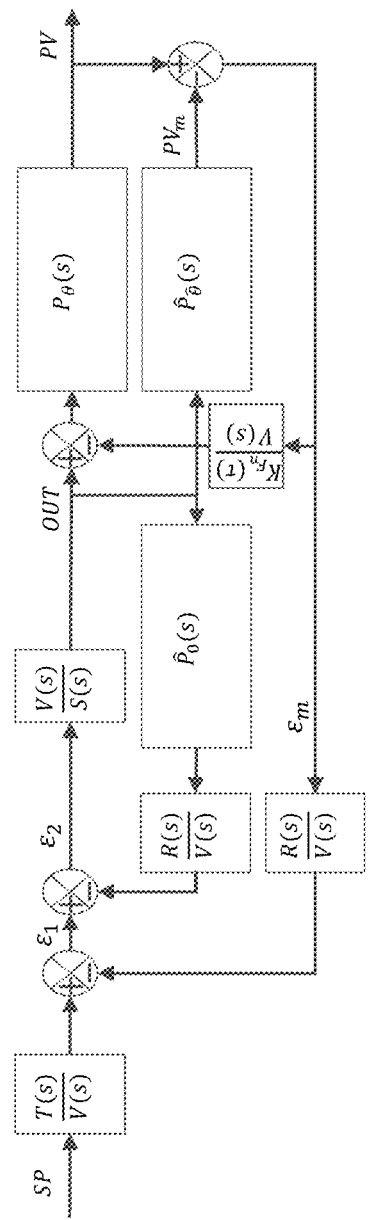
FIG. 11 illustrates a block diagram of an RST Smith predictor or controller incorporating an additional feedback to the output of the command law to make an estimation of the input disturbance, which can be implemented in the control system of FIG. 1, in accordance with a further embodiment of the present disclosure.

FIG. 11 illustrates a block diagram of an RST Smith predictor or controller 1100 incorporating an additional feedback to the output of the command law to make an estimation of the input disturbance, which can be implemented in the control system of FIG. 1, in accordance with a further embodiment of the present disclosure.

Figure 12:
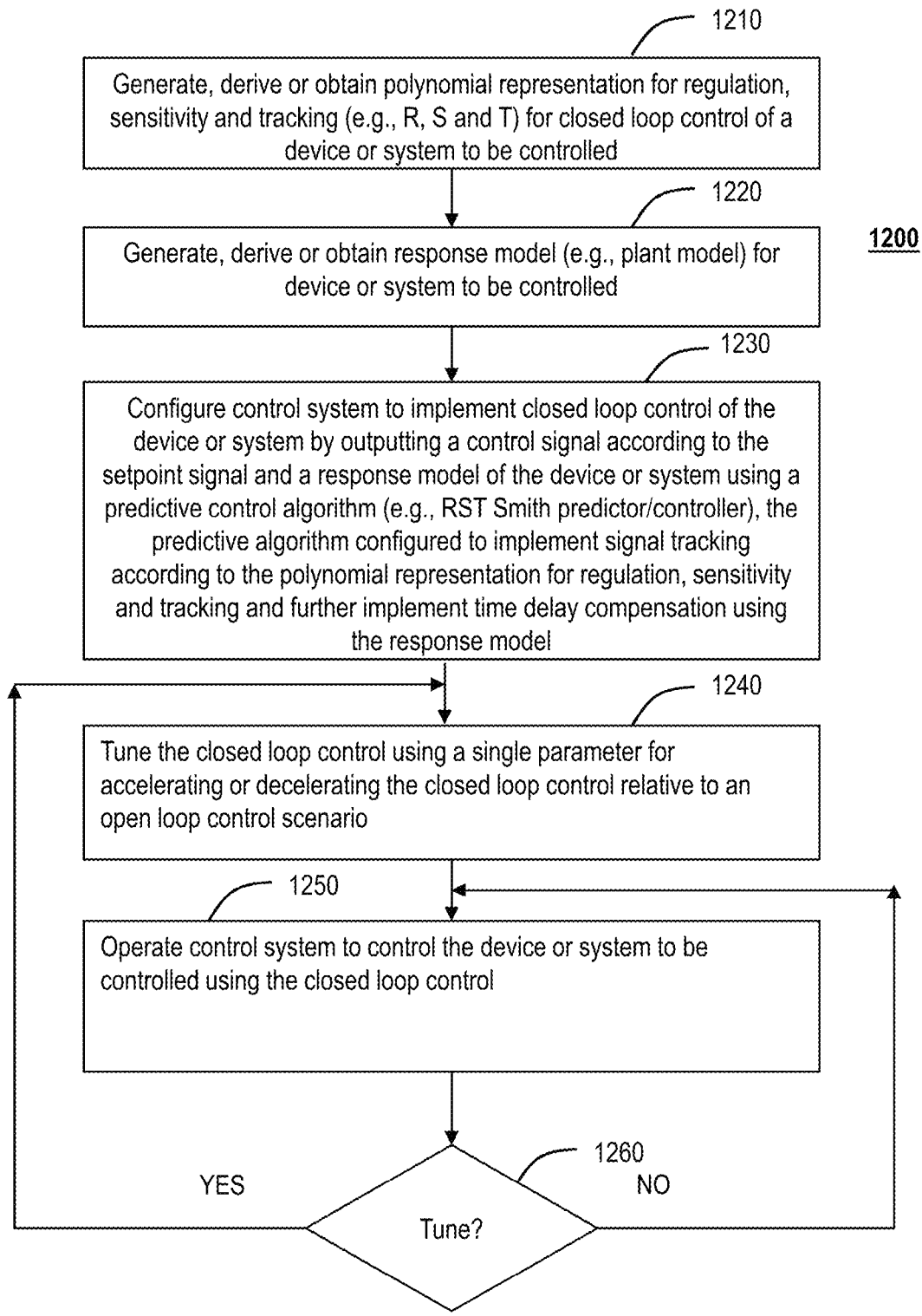
FIG. 12 illustrates an example method of configuring a control system, such as in FIG. 1, to implement an RST Smith predictor or controller to control operation of a device or system (e.g., a plant), in accordance with an embodiment of the present disclosure.

FIG. 12 illustrates an example method 1200 of configuring a control system, such as for example in FIG. 1, to implement an RST Smith predictor or controller to control operation of a device or system (e.g., a plant), in accordance with an embodiment of the present disclosure. By way of example, the operations of the method 1200 will be described with reference to a controller.

At block 1210, the controller generates, derives or obtains polynomial representation for regulation, sensitivity and tracking (e.g., R, S and T) for closed loop control of a device or system to be controlled At block 1220, the controller generates, derives or obtains response model (e.g., plant model) for device or system to be controlled.

At block 1230, the controller configures a control system to implement closed loop control of the device or system by outputting a control signal according to the setpoint signal and a response model of the device or system using a predictive control algorithm (e.g., RST Smith predictor/controller). The predictive algorithm is configured to implement signal tracking according to the polynomial representation for regulation, sensitivity and tracking and further implement time delay compensation using the response model.

At block 1240, the controller tunes the closed loop control using a single parameter for accelerating or decelerating the closed loop control relative to an open loop control scenario.

At block 1250, the controller operates the control system to control the device or system to be controlled using the closed loop control.

At block 1260, a determination can be made on whether to further tune, or not tune the closed loop control. If the closed loop is to be further tuned, then the method 1200 proceeds to 1240. If not, then the method 1200 proceeds to block 1250 for further operation of the control system to control the device or system to be controlled using the closed loop control.

Figure 13:
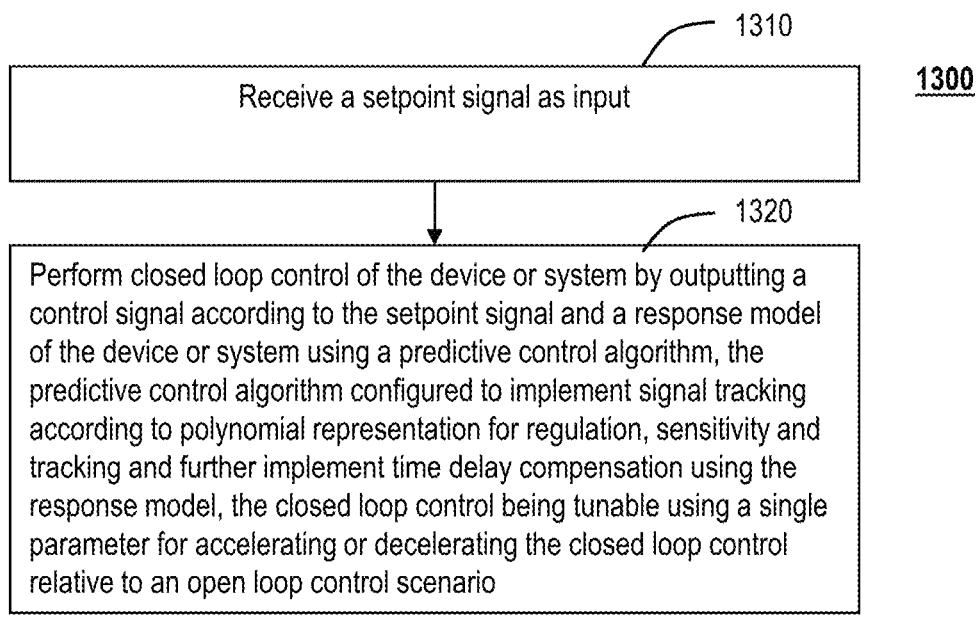
FIG. 13 illustrates an example method of performing control of an operation of a device or system using a control system of FIG. 1, in accordance with an embodiment of the present disclosure.

FIG. 13 illustrates an example method 1300 of performing control of an operation of a device or system using a control system (e.g., in FIG. 1), in accordance with an embodiment of the present disclosure.

At block 1310, the controller receives a setpoint signal as input.

At block 1320, the controller performs closed loop control of the device or system by outputting a control signal according to the setpoint signal and a response model of the device or system using a predictive control algorithm. The predictive control algorithm is configured to implement signal tracking according to polynomial representation for regulation, sensitivity and tracking and further implement time delay compensation using the response model. The closed loop control is tunable using a single parameter for accelerating or decelerating the closed loop control relative to an open loop control scenario.

It should also be understood that the example embodiments disclosed and taught herein are susceptible to numerous and various modifications and alternative forms. Thus, the use of a singular term, such as, but not limited to, "a" and the like, is not intended as limiting of the number of items. Furthermore, the naming conventions for the various components, functions, characteristics, thresholds, and other elements used herein are provided as examples, and can be given a different name or label. The use of the term "or" is not limited to exclusive "or", but can also mean "and/or".

It will be appreciated that the development of an actual, real commercial application incorporating aspects of the disclosed embodiments will require many implementation specific decisions to achieve the developer's ultimate goal for the commercial embodiment. Such implementation specific decisions may include, and likely are not limited to, compliance with system related, business related, government related and other constraints, which may vary by specific implementation, location and from time to time. While a developer's efforts might be complex and time consuming in an absolute sense, such efforts would nevertheless be a routine undertaking for those of skill in this art having the benefit of this disclosure.

Using the description provided herein, the example embodiments may be implemented as a machine, process, or article of manufacture by using standard programming and/or engineering techniques to produce programming software, firmware, hardware or any combination thereof.

Any resulting program(s), having computer-readable program code, may be embodied on one or more tangible or non-transitory computer-usable media such as resident memory devices, smart cards or other removable memory devices, or transmitting devices, thereby making a computer program product or article of manufacture according to the embodiments. As such, the terms "article of manufacture" and "computer program product" as used herein are intended to encompass a computer program that exists permanently or temporarily on any computer-usable or storage medium or in any transmitting medium which transmits such a program.

A processor(s) or controller(s) as described herein can be a processing system, which can include one or more processors, such as CPU, controller, or other processing unit or circuitry, which controls or performs the operations of the devices or systems, described herein. The processor(s) or controller(s) can communicate with memory/storage devices, which can store computer program(s) or application(s) (e.g., software, firmware, etc.), control or other parameter(s) and/or any other data for use in implementing the method and system described herein. Memory/storage devices can include, but are not limited to, disks, solid state drives, optical disks, removable memory devices such as smart cards, SIMS, WIMs, semiconductor memories such as RAM, ROM, PROMS, etc. Transmitting mediums or networks include, but are not limited to, transmission via wireline communication, wireless communication (e.g., Radio Frequency (RF) communication, Bluetooth®, Wi-Fi, Li-Fi, etc.), the Internet, intranets, telephone/modem-based network communication, hard-wired/cabled communication network, satellite communication, and other stationary or mobile network systems/communication links.

The flowchart and block diagrams in the Figures illustrate the architecture, functionality and/or operation of possible implementations of various embodiments of the present disclosure. In this regard, each block in the flowchart or block diagrams may represent a module, segment or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While particular embodiments and applications of the present disclosure have been illustrated and described, it is to be understood that the present disclosure is not limited to the precise construction and compositions disclosed herein and that various modifications, changes, and variations can be apparent from the foregoing descriptions without departing from the invention as defined in the appended claims.

The invention claimed is:

1. A control system for controlling a device or system, comprising:
   memory; and
   at least one processor configured to:
      receive a setpoint signal as input; and
      perform closed loop control of the device or system by outputting a control signal according to the setpoint signal and a response model of the device or system using a predictive control algorithm, the predictive control algorithm being configured to implement control according to a polynomial representation for regulation, sensitivity and tracking and further implement non-linearity or time delay compensation using the response model, the closed loop control being tunable using an adjustable single parameter for accelerating or decelerating the closed loop control relative to an open loop control scenario,
   wherein the polynomial representation comprises at least transfer functions R, S and T for regulation, sensitivity and tracking, respectively, and coefficients for the transfer functions R, S and T are a function of the adjustable single parameter,
   wherein the response model includes a linear part and a non-linear part, and the predictive control algorithm employs the response model to remove non-linearity, thereby compensating for time delay and enabling linear control through an RST control strategy.

2. The control system of claim 1, wherein the closed loop control includes a feedback loop to an output of a command law to make an estimation of an input disturbance.

3. The control system of claim 1, wherein the device or system comprises equipment to be controlled in an industrial process or system.

4. The control system of claim 1, wherein the time delay comprises a dead time.

5. The control system of claim 1, further comprising:
one or more sensors for sensing operating characteristic(s) of the device or system, which is feedback for closed loop control.

6. The control system of claim 1, wherein the memory and at least one processor are part of a controller for an industrial process or system.

7. The control system of claim 1, wherein the adjustable single parameter is the only tuning parameter for the closed loop control.

8. A computer-implemented method of controlling a device or system, comprising:
receiving a setpoint signal as input; and
performing closed loop control of the device or system by outputting a control signal according to the setpoint signal and a response model of the device or system using a predictive control algorithm, the predictive control algorithm being configured to implement control according to a polynomial representation for regulation, sensitivity and tracking and further implement non-linearity or time delay compensation using the response model, the closed loop control being tunable using an adjustable single parameter for accelerating or decelerating the closed loop control relative to an open loop control scenario,
wherein the polynomial representation comprises at least transfer functions R, S and T for regulation, sensitivity and tracking, respectively, and coefficients for the transfer functions R, S and T are a function of the adjustable single parameter,
wherein the response model includes a linear part and a non-linear part, and the predictive control algorithm employs the response model to remove non-linearity, thereby compensating for time delay and enabling linear control through an RST control strategy.

9. The computer-implemented method of claim 8, wherein the closed loop control includes a feedback loop to an output of a command law to make an estimation of an input disturbance.

10. The computer-implemented method of claim 8, wherein the device or system comprises equipment to be controlled in an industrial process or system.

11. The computer-implemented method of claim 8, wherein the time delay comprises a dead time.

12. The computer-implemented method of claim 8, further comprising:
sensing operating characteristic(s) of the device or system using one or more sensors, the sensed operating characteristic(s) being feedback for closed loop control.

13. The computer-implemented method of claim 8, further comprising:
analyzing operation(s) of the device or system to determine if the closed loop control needs to be tuned; and
adaptively tuning the closed loop control using the adjustable single parameter if the closed loop control needs to be tuned.

14. The computer-implemented method of claim 8, wherein the operations of receiving and performing are implemented by a controller for an industrial process or system.

15. The computer-implemented method of claim 8, wherein the adjustable single parameter is the only tuning parameter for the closed loop control.

16. A non-transitory computer medium storing computer executable code, which when executed by one or more processors, is configured to implement a method of controlling a device or system, the method comprising:
receiving a setpoint signal as input; and
performing closed loop control of the device or system by outputting a control signal according to the setpoint signal and a response model of the device or system using a predictive control algorithm, the predictive control algorithm being configured to implement control according to a polynomial representation for regulation, sensitivity and tracking and further implement non-linearity or time delay compensation using the response model, the closed loop control being tunable using an adjustable single parameter for accelerating or decelerating the closed loop control relative to an open loop control scenario,
wherein the polynomial representation comprises at least transfer functions R, S and T for regulation, sensitivity and tracking, respectively, and coefficients for the transfer functions R, S and T are a function of the adjustable single parameter,
wherein the response model includes a linear part and a non-linear part, and the predictive control algorithm employs the response model to remove non-linearity, thereby compensating for time delay and enabling linear control through an RST control strategy.

* * * * *